United States Patent

Ho-Chuan

Patent Number: 4,916,944
Date of Patent: Apr. 17, 1990

[54] DUAL PURPOSE TIRE GAUGE

[76] Inventor: King Ho-Chuan, No. 26, Alley 52, Lane 687, Sec. 2, Ta Tung Road, Hsi Chih Chen, Taipei Hsien, Taiwan

[21] Appl. No.: 310,962

[22] Filed: Feb. 16, 1989

[51] Int. Cl.4 .......................... B60C 23/02; G01L 7/16
[52] U.S. Cl. ...................................... 73/146.8; 73/744
[58] Field of Search ........................ 73/146.8, 744, 146

[56] References Cited

U.S. PATENT DOCUMENTS 3,696,668  10/1972  Patrick ............................. 73/146.8
4,526,030  7/1985  Vecera, Jr. ........................ 73/146.8

Primary Examiner—Donald O. Woodiel
Attorney, Agent, or Firm—Bacon & Thomas

[57] ABSTRACT

Tire air pressure and tire tread depth are measured by a single gauge provided with an air inlet for engaging the tire valve, whereby air pressure from the tire moves a spring-biased piston and causes a free end of a sliding bar to extend outwardly from the gauge, with the pressure reading being displayed on a scale by an indicator needle mounted on a shaft that is rotated by the sliding bar. Measurement of tire tread depth is accomplished by inserting the free end of the sliding bar into the tread space and engaging an outlet end of the gauge against the tread surface to retract the sliding bar and provide a tread depth reading on the scale.

3 Claims, 1 Drawing Sheet

FIG. 1
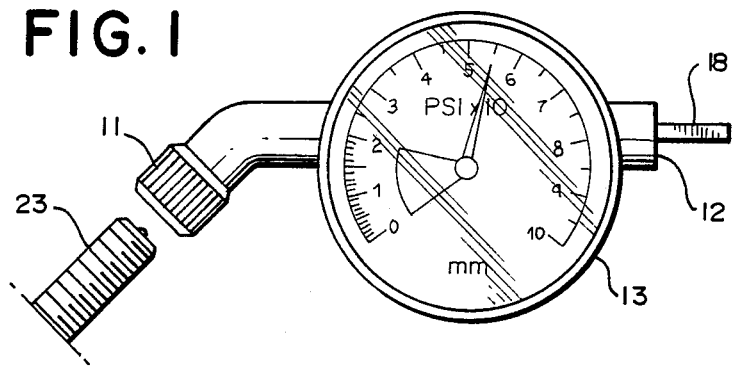
FIG. 2
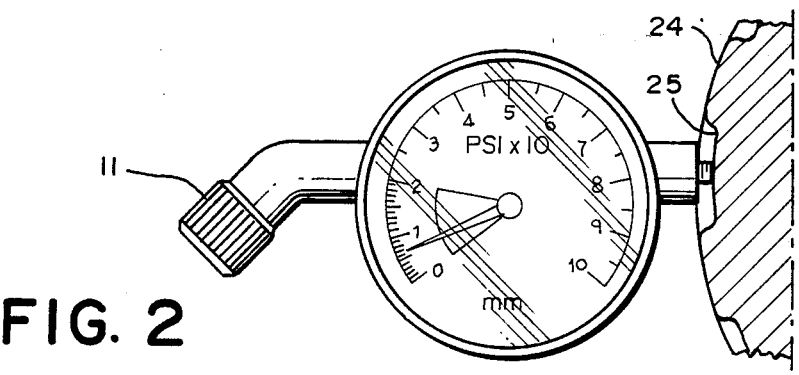
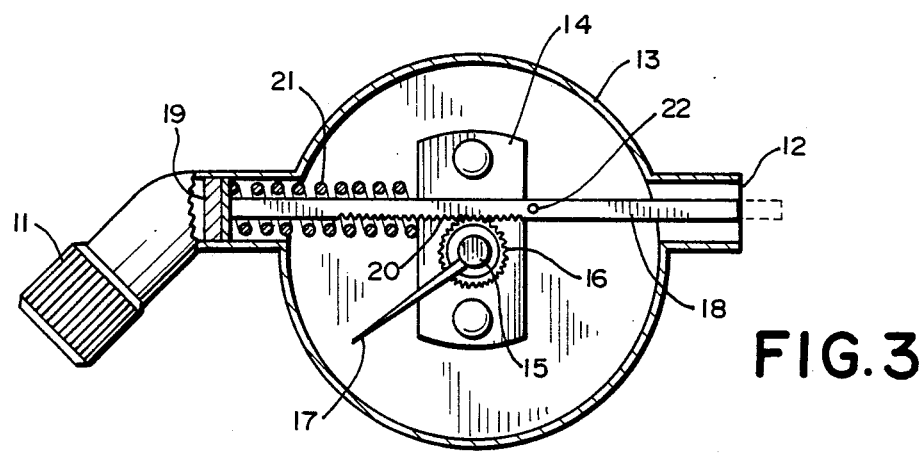
FIG. 3
FIG. 4
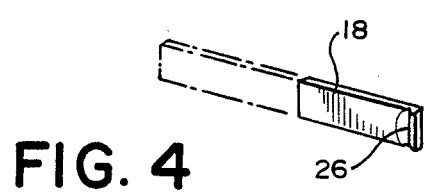

DUAL PURPOSE TIRE GAUGE

BACKGROUND OF THE INVENTION

1. Field of the Invention

The present invention generally involves the field of technology pertaining to tire gauges. More specifically, the invention relates to an improved tire gauge for measuring both tire air pressure and tire tread depth.

2. Description of the Prior Art

A tire air pressure gauge is an essential tool for safe driving. It serves to provide the driver with an immediate reading of tire air pressure so that the required air pressure may be maintained, thereby assuring safety in operation of the vehicle.

Another important factor which may affect the safety of the tire is the tire tread depth. In particular, a tire may be provided with a deep groove tread in the central portion of the tire surface for removing water accumulated within adjacent shallow treads during rotation of the wheel. This water removal serves to prevent aquaplaning of the vehicle. However, if the central groove tread is worn below a safe depth, the water may not be effectively removed, thereby causing possible aquaplaning and skidding of the vehicle.

During general maintenance or routine service of a vehicle, a vehicle technician or the driver often use an elongate strip gauge for measuring tire tread depth after measuring tire air pressure. If a tire is found to be seriously worn, it is usually replaced for safety reasons.

SUMMARY OF THE INVENTION

The present invention provides an improved gauge which serves the dual purpose of measuring both tire air pressure and tire tread depth by a single device, thereby avoiding the necessity of transporting and using separate conventional air pressure and tire tread depth gauges.

It is another object of the invention to provide an improved gauge of simple construction which may be economically manufactured at substantially the same cost as a conventional tire air pressure gauge.

The present invention realizes the foregoing and other objects by providing a dual purpose gauge having a casing within which a spring-biased piston and sliding bar are housed. The sliding bar includes a ratchet which engages a pinion gear carried by a rotatable shaft on which an indicator needle is mounted. The face of the gauge is provided with an appropriate scale for air pressure and tire tread depth readings by the indicator needle. The casing includes an air inlet for engaging the tire air valve and the sliding bar includes a free end extendable outwardly of the casing for engaging the tire tread spacing.

Other objects, advantages and features of the invention shall become apparent from the following detailed description of a preferred embodiment thereof, when taken in conjunction with the accompanying drawings wherein like reference numerals refer to corresponding parts in the several views.

BRIEF DESCRIPTION OF THE DRAWINGS

FIG. 1 is a diagrammatic front elevational view of a dual purpose tire gauge according to a preferred embodiment of the invention, and shown with the air inlet disposed adjacent a standard tire air valve.

FIG. 2 is a diagrammatic front elevational view of the gauge shown with the free end of the sliding bar being disposed within a tire tread spacing for measuring tread depth.

FIG. 3 is a front elevational view, partly in section, of the gauge showing the components disposed in the interior of the casing and the free end of the sliding bar in dotted lines for illustrating a position of extension.

FIG. 4 is a perspective view, partly in phantom section, showing the free end of the sliding bar being provided with a tooth-groove therein.

DETAILED DESCRIPTION OF THE PREFERRED EMBODIMENT

With initial reference to FIGS. 1-3, there is shown a dual purpose tire gauge according to a preferred embodiment of the invention. The gauge includes a hollow casing 13 provided with an air inlet end 11 and an outlet end 12. A sliding bar 18 is disposed within casing 13 and includes a free end which may extend outwardly from outlet end 12. A shaft seat 14 is provided within casing 13 for supporting a rotatable shaft 15 and an associated coaxial pinion gear 16. An indicator needle 17 is mounted on shaft 15. The other end of bar 18 is engageable by a slidable piston 19, with piston 19 being biased towards inlet end 11 by a coil spring 21.

Sliding bar 18 is provided with a toothed rack 20 which is disposed in meshed engagement with pinion gear 16 so that movement of bar 18 along its longitudinal axis causes rotation of shaft 15 and a corresponding movement of indicator needle 17. It is also possible to substitute other forms of engagement means between bar 18 and needle 17, such as a distributed-type gear sliding bar or the like. Spring 21 is positioned between piston 19 and seat 14. A stop pin 22 is provided on bar 18 between seat 14 and outlet end 12 for engaging seat 14 to limit the retraction movement of bar 18 within casing 13 and dispose indicator needle 17 in its position of zero reading on the scale. As seen in FIGS. 1 and 2, a measurement is provided on casing 13 and may include appropriate graduations to indicate both tire air pressure in pounds per square inch (PSI) and tire tread depth in millimeters (mm).

When inlet end 11 of the gauge is engaged against a tire air valve 23 for measuring tire air pressure, the pressurized air will enter into inlet end 11 and cause piston 19 to move against the bias of spring 21, thereby compressing same against shaft seat 14. Since piston 19 engages the internal end of sliding bar 18, the latter is caused to also move along its longitudinal axis, thereby rotating shaft 15 through the meshed engagement between rack 20 and pinion gear 16. A corresponding movement is imparted to indicator needle which provides a reading on the scale corresponding to the tire air pressure. As also apparent, the free end of sliding bar 18 is caused to extend outwardly of outlet end 12 a given distance corresponding to the movement of piston 19. When inlet end 11 is removed from valve 23, piston 19 is urged backward to its original position by spring 21, but sliding bar 18 is maintained in its extended position corresponding to the original movement of piston 19. At this time, the free end of bar 18 may be disposed in the tire tread spacing 25, as shown in FIG. 2, until outlet end 12 engages the tread surface 24, thereby causing bar 18 to retract into casing 13 a distance corresponding to the tread depth. This causes bar 18 to be retracted into casing 13 a distance corresponding to the tire tread depth, thereby rotating shaft 15 and causing indicator needle 17 to move backwardly toward the zero reading position until it stops at a corresponding position on the scale to provide the desired tire tread depth reading.

As seen in FIG. 4, the free end of sliding bar 18 may be provided with a tooth-groove 26 in the event the gauge is only required to measure tire tread depth. In such instance, the user may manually engage groove 26 and extend bar 18 outwardly of casing 13 for an appropriate distance, and thereby measure the tire tread depth in the same manner previously described herein.

It is possible to provide appropriate scales directly on sliding bar 18 so that bar 18 may display readings for tire air pressure and tire tread depth.

The invention therefore provides an improved tire gauge having the ability to serve the dual purpose of measuring tire air pressure and tire tread depth through a device having an extremely simple structure which is convenient to use for taking rapid measurements, thereby overcoming the disadvantages of conventional gauges of this type.

The embodiment of the invention shown and described herein is merely an example of a preferred form thereof, and various changes and modifications shall become apparent to one of ordinary skill in the art and within the scope of the subjoined claims.

What is claimed is:

1. A dual purpose tire gauge comprising:
   (a) a casing including an inlet end, an outlet end and a measurement scale for indicating tire air pressure and tire tread depth readings, the scale including a zero reading position;
   (b) a shaft seat disposed within the casing;
   (c) a rotatable shaft carried by the shaft seat, the rotatable shaft being provided with an indicator needle mounted thereon;
   (d) an elongate sliding bar;
   (e) means engaging the sliding bar to the rotatable shaft whereby movement of the bar along its longitudinal axis rotates the shaft and produces a corresponding reading by the indicator needle on the measurement scale;
   (f) a spring-biased piston positioned adjacent the inlet end, the piston being engageable against a first end of the sliding bar, whereby when the inlet end is disposed in engagement with an air valve of a tire, air pressure moves the piston against the spring bias and causes a second end of the sliding bar to extend outwardly from the outlet end, thereby producing a corresponding reading by the indicator needle of the tire air pressure;
   (g) the sliding bar including a stop pin engageable against the shaft seat for terminating retraction of the bar into the casing and disposing the indicator needle at the zero reading position; and
   (h) when the second end of the sliding bar is extended a sufficient distance from the outlet end, disposition of the second end within a tread spacing and engagement of the outlet end against the surface of a tire causes the indicator needle to produce a reading corresponding to the tire tread depth.

2. The gauge of claim 1 wherein the engagement means includes a toothed rack on the sliding bar and a pinion gear on the rotatable shaft disposed in meshed engagement with the toothed rack.

3. The gauge of claim 1 wherein the second end of the sliding bar includes a tooth-groove for engagement by a user to manually extend the bar from the outlet end.

* * * * *